May 15, 1934.   J. A. DONAHOE   1,959,022
METHOD OF TRIMMING HAMS
Filed May 2, 1931

John A. Donahoe
INVENTOR.
BY Ralph Donath
Paul Purchard
ATTORNEYS.

Patented May 15, 1934

1,959,022

UNITED STATES PATENT OFFICE 1,959,022

METHOD OF TRIMMING HAMS

John A. Donahoe, Pittsburgh, Pa., assignor to Donahoe's Inc., Pittsburgh, Pa., a corporation of Delaware Application May 2, 1931, Serial No. 534,464

3 Claims. (Cl. 17—45)

This invention relates to methods of trimming hams, and more in particular pork hams.

The primary object of this invention is to provide a new method of trimming pork-hams into so-called "shankless" hams whereby the overall length of the ham may be substantially reduced and with the minimum amount of waste of the desirable meat and fat. Another object refers to the trimming of hams to render them more suitable for wrapping in the factories and stores and also more suitable for baking or boiling in the homes. A further object of this invention is to provide a shankless ham which can be cured in a pickling solution and smoked uniformly throughout. Still another object of this invention is the production of a ham which is neat of appearance and which occupies the minimum of space in proportion to its weight.

Additional features and advantages will be dwelt on in the following description considered in connection with the accompanying drawing which forms a part of this application.

This invention is intended to cover certain improvements in the method of trimming hams as disclosed in the Patent No. 1,719,408 of July 2, 1929 of J. A. Waters, in which the two leg bones, tibia and fibula are extracted from the shank end of the ham and the surrounding meat and fat are folded into the cavity left by said bones and the remaining opening sewed up.

Extensive use of the Waters' method of trimming hams has disclosed the fact that the parts of meat and fat folded into above mentioned cavity, after sewing up, could often not be thoroughly smoked and that said parts were left in their pickled condition. Therefore, these folded parts were more liable to deterioration and the flavor of the ham was not as uniform as could be desired. The deterioration would, of course, affect the whole ham in due time and considerably reduce its keeping qualities.

Another objection noted and especially objectionable to the public was that the first few slices cut from the shank end would have too much fat and too little meat and would otherwise present an unexpected appearance.

Figure 1:
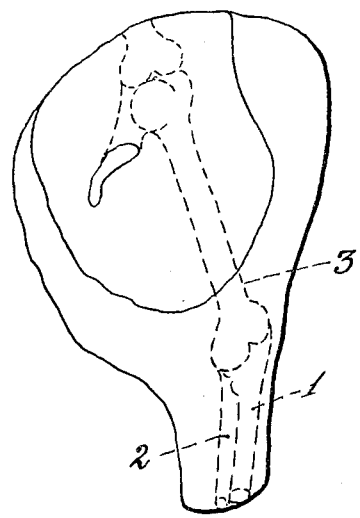
Fig. 1 is a side elevation of a pork-ham trimmed in accordance with the common practice in the trade.
Figure 2:
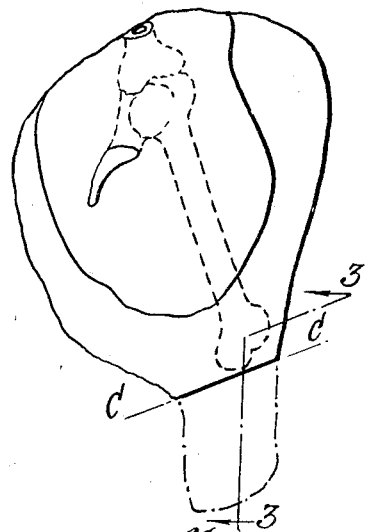
Fig. 2 is a broad-side elevation of a ham showing the first additional step taken in trimming the ham, in accordance with my invention.

Referring to the drawing, the method of trimming hams in accordance with my invention consists in cutting the shank-end of the ham substantially along an oblique line C—C, Fig. 2, and completely removing the tibia 1 and the fibula 2 at their junction with the thigh bone or femur 3, as well as all the fat, meat and rind pertaining to the shank-end.

Figure 3:
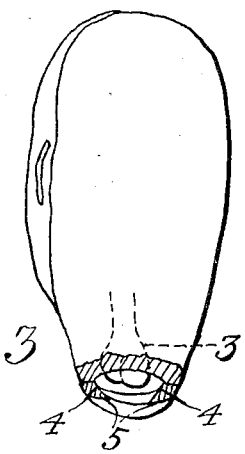
Fig. 3 shows another side elevation of the ham after the shank has been removed, the shank end of the ham being shown in section substantially along line 3—3 in Fig. 2.
Figure 4:
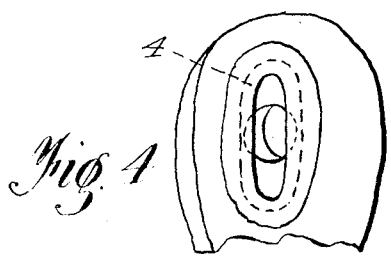
Fig. 4 is a fragmentary view of the shank end of Fig. 3.
Figure 6:
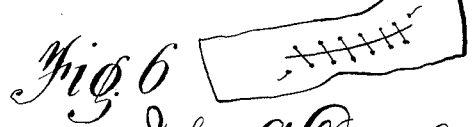
Fig. 6 is a fragmentary end view of Fig. 5 showing one method of sewing up the shank-end.

The meat or fat on the ham, adjacent the cut-end is then undercut or slightly bevelled off underneath the rind as suggested at 4, Figs. 3 and 4, to enable the folding of the edges of said rind over the end of the femur and to bring the edges of the rind into close juxtaposition.

Figure 5:
Fig. 5 is a side elevation of the finished shankless ham.

The rind-edges 5 are then sewed together with twine or thread 6. The meat and fat near the sewed end are then suitably tamped to give to this end a rounded shape, as shown in Fig. 5.

When so trimmed, the ham will present a substantially oval shaped appearance and its length will have been sufficiently shortened, without wasting much of its commercially useful weight, to enable an average size ham to be boiled or baked in suitable vessels of the size generally found in most homes. Moreover, both ends of the ham can be carved equally as well and will produce substantially the same kind of slices.

As is well known to those versed in the art, retailers of hams are very often compelled to saw off the shank portion of a ham because the purchasing public is ever more unwilling to buy hams trimmed according to the usual method. This time wasting sawing away of a portion of the leg-bones with the meat and fat attached thereto causes important financial losses to the retailers since the cut off portions must either be scrapped or sold at a substantial loss in order to dispose of them in the trade.

Moreover, the trend in the retail sale of hams, especially in cities, is to buy only one half of a ham at a time, the public preferring the buttock-portion of the ham, so that the shank-portion with the leg-bones is hard to dispose of and will remain on the hands of the retailers, unless sold at a reduced price.

By trimming a ham according to my method, it will be noted, from Fig. 5 that the ham assumes a substantially symmetrical, elliptic or oval, form which permits of the easy disposal of the shank-portion of the ham since in its appearance it resembles very much the buttock-portion of the ham and because it is free of the objectionable leg-bones. Thus, the retailer is enabled to dispose equally as well of both halves of a ham and obtain a better price for the shank-portion thereof.

Aside from the strictly financial advantages, a ham trimmed in this novel manner offers moreover additional advantages which may be succinctly stated as follows:

The wrapping of a ham in cloth or paper requires considerably less material and is more easily performed owing to the more uniform and rounded form of the ham. Also, said wrapping material will not be torn so readily, as is usually the case with hams of the old style, because of the absence of the sharply cut and protruding leg-bones. Another advantageous feature lies in the fact that the nicely rounded hams will not mar polished surfaces nor break the plate-glass or marble tops of either display counters or weighing scales, since such damages are generally due to the protruding leg-bones.

Furthermore, a ham trimmed according to my method, when accidentally dropped, will not injure seriously the person on whom it falls, nor will the danger of infection through scratching or cutting of the hands of a person handling a ham be as great, because of the absence of the leg-bones, the latter being, on account of their exposed ends, the principal cause of injuries.

As stated hereinbefore, a ham trimmed according to my method will fit more easily in cooking-pans; it will be more economical to the consumer in that no meat or fat is wasted; it will not require the cooking of the leg-bones which are generally discarded, and a whole ham, either raw or cooked, will present a more pleasing appearance on a display counter, or when served on the table.

Hams trimmed in the manner described may be hung for smoking in any desired position; but I prefer to smoke them while suspended with the shank-ends in lowermost position, as it enables part of the meat and fat in the buttock-portion to sag, while still soft, into the sewed up cavity of the ham, thus producing a well rounded ham of substantially uniform density throughout.

As will be understood, there may be slight changes made in the construction and arrangement of the details of this invention without departing from the field and scope of the same, and I intend to include all such variations, as fall within the scope of the appended claims, in this application in which the preferred form only of my invention has been disclosed.

I claim:

1. The method of trimming a ham which consists in sawing off the shank portion thereof at an oblique angle substantially at the junction of the two leg-bones with the thigh-bone, undercutting obliquely the meat and fat adhering to the rind and adjacent the end of the cut, and folding said rind and adhering meat and fat permanently over the end of the thigh-bone.

2. The method of trimming a ham which consists in sawing off the shank portion thereof at an oblique angle substantially at the junction of the two leg-bones with the thigh-bone, undercutting obliquely the meat and fat adhering to the rind and adjacent the end of the cut; folding said rind and adhering meat and fat over the end of the thigh-bone, subsequently sewing the cut-end of the ham permanently over the end of the thigh-bone, and imparting to the sewed up portion a curved shape.

3. A ham having its shank cut off at an oblique angle substantially at the junction of the two leg-bones with the thigh-bone, the meat and fat adhering to the rind adjacent the cut being first undercut obliquely and then folded inwardly and the said rind with adhering meat and fat being permanently held in folded condition.

JOHN A. DONAHOE.